United States Patent
Park et al.

(10) Patent No.: US 7,831,215 B2
(45) Date of Patent: Nov. 9, 2010

(54) TRANCEIVER CIRCUIT FOR COMPENSATING IQ MISMATCH AND CARRIER LEAKAGE AND METHOD FOR CONTROLLING THE SAME

(75) Inventors: Joonbae Park, Seoul (KR); Kyeongho Lee, Seoul (KR)

(73) Assignee: GCT Research, Inc., Shindaebang Dong, Dongjak Gu, Seoul (KR)

( * ) Notice: Subject to any disclaimer, the term of this patent is extended or adjusted under 35 U.S.C. 154(b) by 756 days.

(21) Appl. No.: 11/708,705

(22) Filed: Feb. 21, 2007

(65) Prior Publication Data

US 2007/0202812 A1 Aug. 30, 2007

(30) Foreign Application Priority Data

Feb. 23, 2006 (KR) ...................... 10-2006-0017522

(51) Int. Cl.
*H04B 1/40* (2006.01)
(52) U.S. Cl. .................... 455/88; 455/85; 455/67.11; 455/67.14; 455/296; 455/115.1; 455/63.1; 455/323; 455/226.1; 455/118; 375/219; 375/298; 375/302; 375/332
(58) Field of Classification Search ............... 455/73, 455/67.14, 67.11, 67.13, 296, 115.1, 88, 455/118, 119, 323, 226.1, 63.1, 85; 375/219, 375/298
See application file for complete search history.

(56) References Cited

U.S. PATENT DOCUMENTS 5,949,821 A      9/1999   Emami et al.
6,044,112 A      3/2000   Koslov
6,970,689 B2 *  11/2005   Khorram ..................... 455/326
7,020,220 B2 *   3/2006   Hansen ........................ 375/324
7,184,714 B1 *   2/2007   Kutagulla et al. ............. 455/73
7,187,916 B2 *   3/2007   Mo et al. ..................... 455/323
7,248,625 B2 *   7/2007   Chien ......................... 375/219
7,310,387 B2 *  12/2007   Kim et al. ................... 375/316
7,333,423 B2 *   2/2008   Palaskas et al. ............. 370/210
7,362,826 B2 *   4/2008   Willingham ................ 375/327
7,433,298 B1 *  10/2008   Narasimhan ................ 370/208
7,463,864 B2 *  12/2008   Vassiliou et al. .............. 455/73
7,463,866 B1 *  12/2008   Chen ............................ 455/91
7,496,340 B1 *   2/2009   Chen et al. ................... 455/296
7,539,268 B2 *   5/2009   Fechtel ....................... 375/296
7,567,783 B1 *   7/2009   Chen .......................... 455/130
2004/0217753 A1* 11/2004  Yamanaka et al. ....... 324/76.21
2004/0219884 A1* 11/2004  Mo et al. ................. 455/67.11

FOREIGN PATENT DOCUMENTS

KR          2005-66953           3/2006

* cited by examiner

*Primary Examiner*—Marceau Milord
(74) *Attorney, Agent, or Firm*—Muir Patent Consulting, PLLC

(57) ABSTRACT

Embodiments of methods, transceiver circuits, and systems can compensate an IQ mismatch (e.g., Tx or Rx) or a carrier leakage using a plurality of local oscillators. One embodiment of a transceiver can include a first up-conversion IQ mixer, a second up-conversion IQ mixer, a first down-conversion IQ mixer with an input to receive an output of the second up-conversion IQ mixer, a second down-conversion IQ mixer with an input to receive an output of the first up-conversion IQ mixer, a first local oscillator to generate a first IQ LO signal for the first up-conversion IQ mixer and the first down-conversion IQ mixer, and a second local oscillator to generate a second IQ LO signal for the second up-conversion IQ mixer and the second down-conversion IQ mixer.

21 Claims, 3 Drawing Sheets

TRANCEIVER CIRCUIT FOR COMPENSATING IQ MISMATCH AND CARRIER LEAKAGE AND METHOD FOR CONTROLLING THE SAME

BACKGROUND

1. Field

The invention relates to a transceiver circuit for compensating an IQ mismatch and/or a carrier leakage.

2. Background

A technology for converting a base band signal (hereinafter referred to as 'BB signal') or an intermediate frequency signal (hereinafter referred to as 'IF signal') to a radio frequency signal (hereinafter referred to as 'RF signal') or converting the RF signal to the BB signal or IF signal using an IQ mixer is widely used in a wireless communication field.

However, a carrier leakage and an IQ mismatch occur in a real IQ mixer. The carrier leakage is a phenomenon that occurs when an IQ local oscillator (LO) signal leaks to an output of the IQ mixer as well as when a product of an input signal and the IQ LO signal transmitted from an local oscillator is transmitted to the output of the IQ mixer. The IQ mismatch includes a gain imbalance that occurs because of a difference in amplitudes of an in-phase signal and the quadrature signal transmitted to the IQ mixer from the oscillator and a phase imbalance that occurs because of a phase difference between the in-phase signal and the quadrature signal not being 90°. When the carrier leakage and the IQ mismatch occur, an undesirable noise component exists in the output of the IQ mixer to degrade a signal-to-noise ratio.

In accordance with related art technologies (e.g., U.S. Pat. Nos. 5,949,821; 6,044,112; Korean Patent Publication No. 10-2005-66953), a method for measuring an Rx IQ mismatch using a received signal transmitted through a wireless communication has been disclosed. However, in accordance with the method, the IQ mismatch is measured using the received signal. Therefore, the methods are disadvantageous in that an IQ mismatch of a signal that is received prior to a compensation of the IQ mismatch cannot be compensated or that an accuracy of the IQ mismatch measured is degraded by a noise of a wireless channel included in the received signal.

Other related art technology such as U.S. Publication No. 2005/0070236 discloses a method wherein a test signal is inputted to a down-conversion IQ mixer to measure the Rx IQ mismatch. However, the method disclosed by the publication is disadvantageous in that a separate test signal is required.

The above references are incorporated by reference herein where appropriate for appropriate teachings of additional or alternative details, features and/or technical background.

SUMMARY OF THE INVENTION

An object of embodiments of the invention is to provide a tranceiving circuit and a method to compensate Tx carrier leakage, Tx IQ mismatch and/or Rx IQ mismatch.

Another object of embodiments of the invention is to provide a tranceiving circuit and a method for controlling the same where a Tx carrier leakage, a Tx IQ mismatch or a Rx IQ mismatch can be measured by inputting an output signal of an up-conversion mixer to a down-conversion mixer rather than using a signal received via a wireless communication to measure the Tx carrier leakage, the Tx IQ mismatch or the Rx IQ mismatch.

Another object of embodiments of the invention is to provide a tranceiving circuit and a method that can improve efficiency of the measuring process or reduce an measurement error caused by noise by the wireless communication for a Tx carrier leakage, a Tx IQ mismatch or a. Rx IQ mismatch.

Another object of embodiments of the invention is to provide a tranceiving circuit and a method for controlling the same where a load condition during a period of measuring a Tx carrier leakage, a Tx IQ mismatch or a Rx IQ mismatch is maintained relative to or with identical to a load condition during a normal operation period so that variations of the Tx carrier leakage, the Tx IQ mismatch or the Rx IQ mismatch responsive to variations of the load condition of the local oscillator may be reduced or prevented.

Another object of embodiments of the invention is to provide a tranceiving circuit and a method for controlling the same where an up-conversion IQ mixer and a down-conversion IQ mixer use different IQ LO frequencies during measurement of a Tx carrier leakage, a Tx IQ mismatch or a Rx IQ mismatch to increase an accuracy of the Tx carrier leakage, the Tx IQ mismatch or the Rx IQ mismatch measurement.

To achieve at least the above objects in whole or in part, there is provided a method for controlling a transceiver circuit that can include (a) measuring a Tx carrier leakage using a signal obtained by passing a Tx carrier leakage included in an output of the first up-conversion IQ mixer through the second down-conversion IQ mixer, (b) measuring a Tx IQ mismatch using a signal being passed through the first up-conversion IQ mixer and the second down-conversion IQ mixer, (c) measuring a Rx IQ mismatch using a signal being passed through the second up-conversion IQ mixer and the first down-conversion IQ mixer, and (d) carrying out transmission/reception using the first up-conversion IQ mixer and the first down-conversion IQ mixer during an operation period, wherein the first local oscillator generates a first IQ LO signal used in the first up-conversion IQ mixer and the first down-conversion IQ mixer, and the second oscillator generates a second IQ LO signal used in the second up-conversion IQ mixer and the second down-conversion IQ mixer.

To achieve at least the above objects in whole or in part, there is provided a method for controlling a transceiver circuit that can include measuring a Tx carrier leakage using a signal obtained by passing a Tx carrier leakage included in an output of the first up-conversion IQ mixer through the second down-conversion IQ mixer, and performing transmission/reception using the first up-conversion IQ mixer and the first down-conversion IQ mixer during an operation period, wherein the first local oscillator generates a first IQ LO signal used in the first up-conversion IQ mixer and the first down-conversion IQ mixer, and the second oscillator generates a second IQ LO signal used in the second down-conversion IQ mixer.

To achieve at least the above objects in whole or in part, there is provided a method for controlling a transceiver circuit that can include measuring a Tx IQ mismatch using a signal being passed through the first up-conversion IQ mixer and the second down-conversion IQ mixer, carrying out a TDD type transmission/reception using the first up-conversion IQ mixer and the first down-conversion IQ mixer during a normal operation period, wherein the first local oscillator generates a first IQ LO signal used in the first up-conversion IQ mixer and the first down-conversion IQ mixer, and the second oscillator generates a second IQ LO signal used in the second down-conversion IQ mixer.

To achieve at least the above objects in whole or in part, there is provided a method for controlling a transceiver circuit that can include measuring a Rx IQ mismatch using a signal being passed through the second up-conversion IQ mixer and the first down-conversion IQ mixer, carrying out a transmission/reception using the first up-conversion IQ mixer and the first down-conversion IQ mixer during an operation period, generating a first IQ LO signal used in the first up-conversion IQ mixer and the first down-conversion IQ mixer using the first local oscillator, and generating a second IQ LO signal used in the second up-conversion IQ mixer using the second oscillator.

In one embodiment, it is preferable that the first up-conversion IQ mixer and the second down-conversion IQ mixer are operational and the second up-conversion IQ mixer and the first down-conversion IQ mixer are non-operational to measure the Tx carrier leakage or the Tx IQ mismatch, and the second up-conversion IQ mixer and the first down-conversion IQ mixer are operational and the first up-conversion IQ mixer and the second down-conversion IQ mixer are non-operational to measure the Rx IQ mismatch.

To achieve at least the above objects in whole or in part, there is provided a transceiver circuit that can include a first up-conversion IQ mixer, a second up-conversion IQ mixer, a first down-conversion IQ mixer with an input to receive an output of the second up-conversion IQ mixer, a second down-conversion IQ mixer with an input to receive an output of the first up-conversion IQ mixer, a first local oscillator to generate a first IQ LO signal coupled to the first up-conversion IQ mixer and the first down-conversion IQ mixer, and a second local oscillator to generate a second IQ LO signal coupled to the second up-conversion IQ mixer and the second down-conversion IQ mixer.

BRIEF DESCRIPTION OF THE DRAWINGS

Embodiments will be described in detail with reference to the following drawings in which like reference numerals refer to like elements wherein.

DETAILED DESCRIPTION

Embodiments according to the invention will now be described with reference to the accompanied drawings. The interpretations of the terms and wordings used in description and claims should not be limited to common or literal meanings. Embodiments are provided for the more complete understanding of those skilled in the art.

Figure 1:
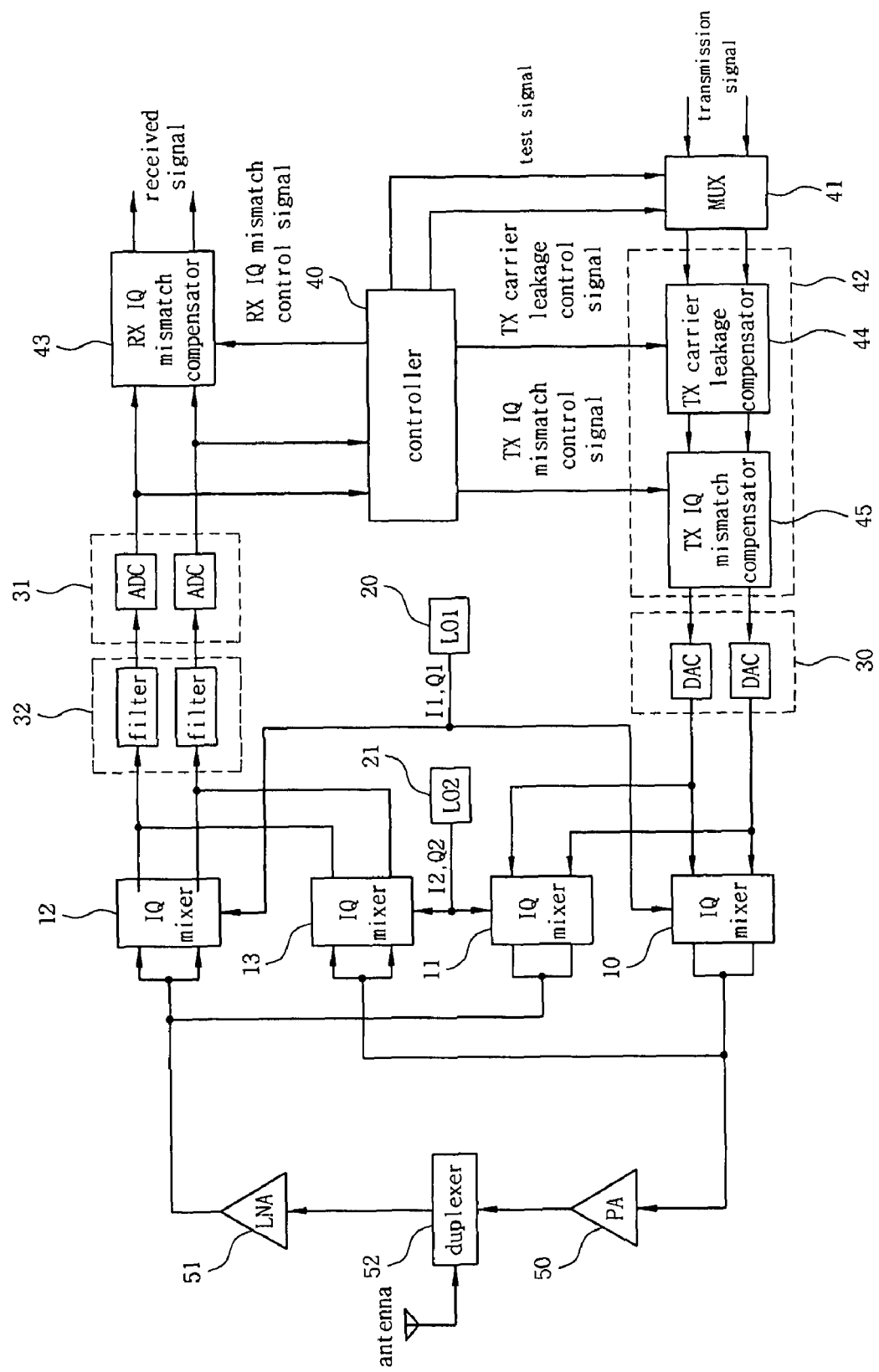
FIG. 1 is a diagram illustrating a transceiver circuit in accordance with an embodiment of the invention.

FIG. 1 is a diagram illustrating an embodiment of a transceiver circuit in accordance with the invention. While a TDD (time division duplex) type transceiver circuit is shown in FIG. 1, transceiver circuits in accordance with the embodiments of the invention are not intended to be limited to the TDD type.

As shown in FIG. 1, one embodiment of the transceiver circuit can include a first up-conversion mixer 10, a second up-conversion mixer 11, a first down-conversion mixer 12, a second down-conversion mixer 13, a first local oscillator 20 and a second local oscillator 21. In addition, the embodiment of the transceiver circuit may further include an IQ DAC 30, an IQ ADC 31, an IQ filter 32, a controller 40, a multiplexer 41, a Tx compensator 42, a Rx IQ mismatch compensator 43, a power amplifier 50, a low noise amplifier 51 and a duplexer 52.

The first up-conversion mixer 10 and the second up-conversion mixer 11 can receive a signal transmitted to the IQ DAC 30 (e.g., a transmission signal) and output an up-converted signal. The first up-conversion mixer 10 can receive a first in-phase signal I1 and a first quadrature signal Q1 (herein referred to as "IQ LO signal") and a signal outputted by the IQ DAC 30, and output the up-converted signal by multiplying the signal outputted by the IQ DAC 30 and a first IQ LO signal I1, Q1. The output of the first up-conversion mixer 10 can be inputted to the second down-conversion mixer 13 during a test period. The first up-conversion mixer 10 is preferably operational during a period of measuring a Tx carrier leakage and a Tx IQ mismatch of the test period, and non-operational during a period of measuring a Rx IQ mismatch. A power of a signal inputted from the IQ DAC 30 to the first up-conversion mixer 10 during the period of measuring a Tx carrier leakage of the test period can correspond to zero. The output of the first up-conversion mixer 10 can be inputted to the power amplifier 50 during a normal operation period. When the transceiver circuit operates as the TDD type, the first up-conversion IQ mixer 10 can be operational during a transmission period of the normal operation period and non-operational during a reception period of the normal operation period.

On the other hand, the second up-conversion mixer 11 can receive a second IQ LO signal I2, Q2 and the signal outputted by the IQ DAC 30, and output the up-converted signal by multiplying the signal outputted by the IQ DAC 30 and the second IQ LO signal I2, Q2. The output of the second up-conversion mixer 11 is preferably inputted to the first down-conversion mixer 12 during the test period. The second up-conversion mixer 11 is preferably operational during the period of measuring the Rx IQ mismatch, and non-operational during the period of measuring the Tx carrier leakage and the Tx IQ mismatch of the test period.

The first down-conversion mixer 12 and the second down-conversion mixer 13 can receive an inputted signal and output a down-converted signal to be transmitted to the IQ filter 32. The first down-conversion mixer 12 can output the down-converted signal obtained by multiplying the inputted signal and the first IQ LO signal I1, Q1 outputted by the first local oscillator 20. The output of the second up-conversion mixer 11 can be inputted to the first down-conversion mixer 12 during the test period. The first down-conversion mixer 12 is preferably operational during the period of measuring the Rx IQ mismatch, and non-operational during the period of measuring the Tx carrier leakage and the Tx IQ mismatch of the test period. An output of the low noise amplifier 51 can be inputted to the first down-conversion mixer 12. When the transceiver circuit operates (e.g., as the TDD type), the first down-conversion mixer 12 can be operational during the reception period of the normal operation period and non-operational during a transmission period of the normal operation period.

On the other hand, the second down-conversion mixer 13 can output the down-converted signal obtained by multiplying the inputted signal and the second IQ LO signal I2, Q2 outputted by the second local oscillator 21. The output of the first up-conversion mixer 10 can be inputted to the second down-conversion mixer 13 during the test period. The second down-conversion mixer 13 can be operational during the period of measuring the Tx carrier leakage and the Tx IQ mismatch, and non-operational during the period of measuring the Rx IQ mismatch of the test period.

The first local oscillator 20 can generate the first IQ LO signal I1, Q1 transmitted to the first up-conversion mixer 10 and the first down-conversion mixer 12. The second local oscillator 21 can generate the second IQ LO signal I2, Q2 to be transmitted to the second up-conversion mixer 11 and the second down-conversion mixer 13. Frequencies of the first IQ LO signal I1, Q1 and the second IQ LO signal I2, Q2 can be and preferably are different.

The IQ DAC 30 converts a digital signal outputted by the Tx compensator 42 to an analog signal. The IQ ADC 31 converts an analog signal outputted by the IQ filter 32 to a digital signal.

The IQ filter 32 can be positioned between the first and the second down-conversion mixers 12 and 13 and the IQ ADC 31. The IQ filter 32 may be a low pass filter, a band pass filter, or the like.

The multiplexer 41 can select and output one of the test signal transmitted using the controller 40 and a transmission signal corresponding to the transmitted RF signal to be transmitted to an antenna. The test signal can be a test signal for measuring one of the Tx IQ mismatch and the Rx IQ mismatch. The transmission signal may be the BB signal or the IF signal.

The Tx compensator 42 can compensate a signal outputted by the multiplexer 41 for the Tx carrier leakage and the Tx IQ mismatch according to a Tx carrier leakage control signal and a Tx IQ mismatch control signal transmitted from the controller 40. Preferably, the Tx compensator 42 does not compensate during the period of measuring the Tx carrier leakage and the Rx IQ mismatch, but transmits "as is" the signal outputted by the multiplexer 41 to the IQ DAC 30. In addition, the Tx compensator 42 can compensate the signal outputted by the multiplexer 41 for only the Tx carrier leakage and transmit the compensated signal to the IQ DAC 30 during the period of measuring the Tx IQ mismatch. In addition, the Tx compensator 42 can compensate the signal outputted by the multiplexer 41 for the Tx carrier leakage and the Tx IQ mismatch and transmits the compensated signal to the IQ DAC 30 during the normal operation period. The Tx compensator 42 can include a Tx carrier leakage compensator 44 compensating for the Tx carrier leakage, and a Tx IQ mismatch compensator 45 compensating for the Tx IQ mismatch. For example, the Tx carrier leakage compensator 44 may carry out an operation expressed in Equation 1, and the Tx IQ mismatch compensator 45 may carry out an operation expressed in Equation 2.

$$LC\_I = M\_I + C1\_I$$

$$LC\_Q = M\_Q + C1\_Q \qquad \text{Equation 1}$$

$$TMC\_I = LC\_I$$

$$TMC\_Q = C2\_AMP \times (LC\_Q - C2\_PHS \times LC\_I) \qquad \text{Equation 2}$$

where LC_I and LC_13 Q denote signals of an I channel and a Q channel of the output of the Tx carrier leakage compensator 44, M_I and M_Q denote signals of an I channel and a Q channel of the output of the multiplexer 41, C1_I and C1_Q denote signals of an I channel and a Q channel of the output of the controller 40, and TMC_I and TMC_Q denote signals of an I channel and a Q channel of the output of the Tx IQ mismatch compensator 45, and C2_AMP and C2_PHS denote control signals corresponding to a gain error and a phase error of the Tx IQ mismatch control signal outputted by the controller 40. For example, when the first in-phase signal I1 is cos ωt that is multiplied to the signal outputted by the IQ DAC 30 in the first up-conversion mixer 10 due to the IQ mismatch and the first quadrature signal Q1 is (1+α)sin(ωt+θ)≈(1+α){sin ωt+sin θ×I1}, C2_AMP is the control signal corresponding to 1/(1+α) and C2_PHS is the control signal corresponding to sin θ.

The Rx IQ mismatch compensator 43 can compensate a signal inputted for the Rx IQ mismatch according to the Rx IQ mismatch control signal transmitted from the controller 40. Preferably, the Rx IQ mismatch compensator 43 is operational during the normal operation period. The Rx IQ mismatch compensator 43 may carry out an operation expressed in Equation 3.

$$RMC\_I = DS\_I$$

$$RMC\_Q = C3\_AMP \times (DS\_Q - C3\_PHS \times DS\_I) \qquad \text{Equation 3}$$

where RMC_I and RMC_Q denote signals of an I channel and a Q channel of the output of the Rx IQ mismatch compensator 43, DS_I and DS_Q denote signals of an I channel and a Q channel of the output of the IQ ADC 31, and C3_AMP and C3_PHS denote control signals corresponding to a gain error and a phase error of the Rx IQ mismatch control signal outputted by the controller 40. For example, when the first in-phase signal I1 is cos ωt that is multiplied to the signal inputted to the first down-conversion mixer 12 due to the IQ mismatch and the first quadrature signal Q1 is (1+β)sin(ωt+Φ)≈(1β){sin ωt+sin Φ×I1}, C3_AMP is the control signal corresponding to 1/(1+β) and C2_PHS is the control signal corresponding to sin Φ. The controller 40 can generate the test signal and transmit the generated test signal to the multiplexer 41. The controller 40 can measure the Tx carrier leakage, the Tx IQ mismatch and the Rx IQ mismatch using a signal transmitted from the IQ ADC 31, and generate the Tx carrier leakage control signal, the Tx IQ mismatch control signal and the Rx IQ mismatch control signal according to the measured result to control the Tx compensator 42 and the Rx IQ mismatch compensator 43.

The power amplifier 50 can amplify the output of the first up-conversion mixer 10 and transmit the amplified output to the duplexer 52. The low noise amplifier 51 can amplify a signal transmitted from the duplexer 52 (e.g., from the antenna) and transmit the amplified signal to the first down-conversion mixer 12.

The duplexer 52 can transmit the transmission RF signal to an antenna from the first up-conversion mixer 10 via the power amplifier 50 during the transmission period of the normal operation period, and transmit the received RF signal transmitted from the antenna to the first down-conversion mixer 12 via the low noise amplifier 51 during the reception period of the normal operating period.

Figure 2:
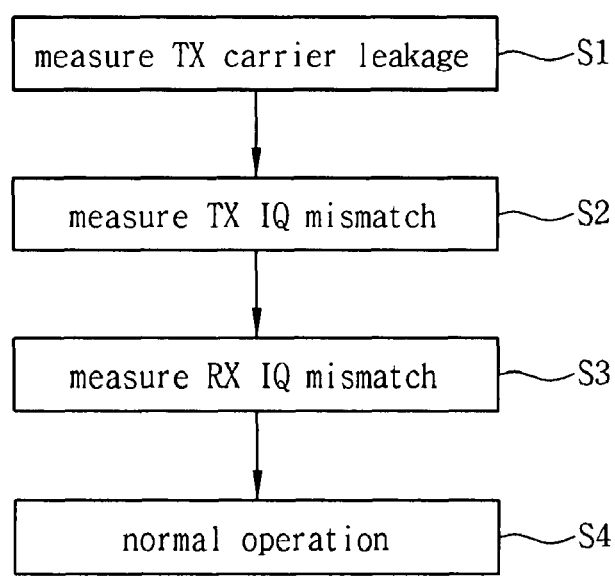
FIG. 2 is a flow chart illustrating a method for controlling a transceiver in accordance with an embodiment of the invention.

FIG. 2 is a flow chart illustrating a method for controlling a transceiver circuit in accordance with an embodiment of the invention. The method shown in FIG. 2 will be described using the transceiver circuit of FIG. 1. However, the embodiments of methods according to the invention are not intended to be so limited.

Figure 3:
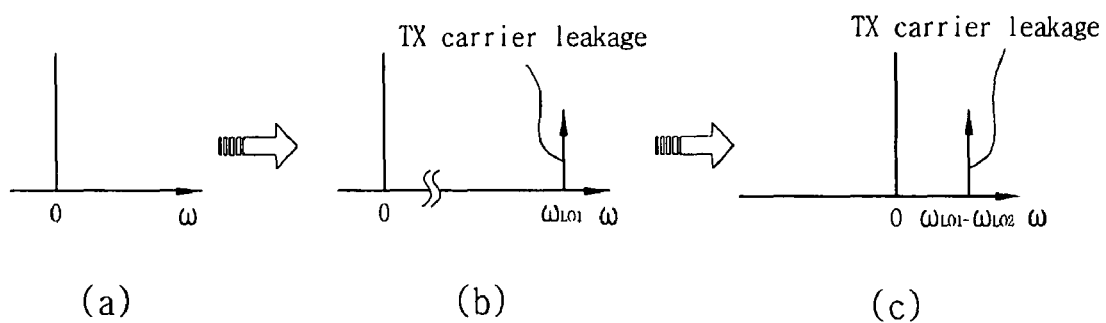
FIGS. 3 through 5 are diagrams respectively illustrating positions of exemplary signals in a frequency domain generated to measure a Tx carrier leakage, a Tx IQ mismatch and a Rx IQ mismatch.
Figure 4:
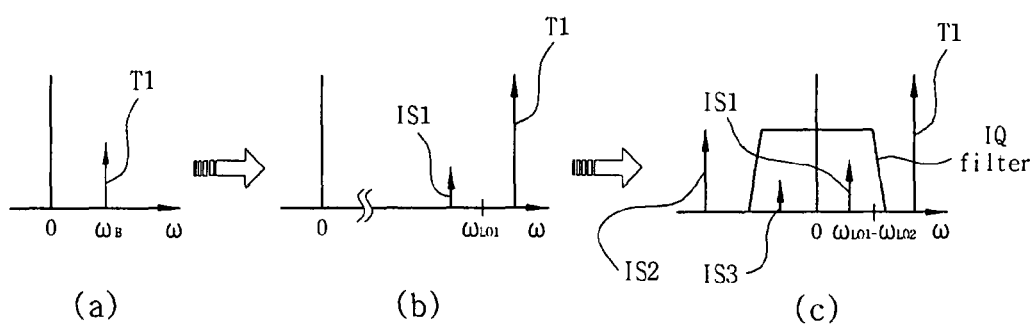
Figure 5:
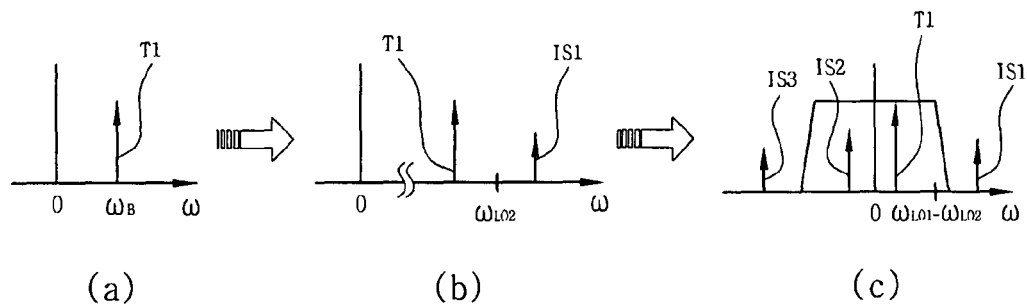

FIGS. 3 through 5 are diagrams illustrating positions of exemplary signals in a frequency domain generated during Tx carrier leakage measuring, Tx IQ mismatch measuring and a Rx IQ mismatch measuring, respectively.

Referring to FIGS. 1 through 5, one embodiment of a method for controlling the transceiver circuit can include a Tx carrier leakage measuring (block S1), Tx IQ mismatch measuring (block S2), a Rx IQ mismatch measuring (block S3), and normal operations (block S4).

In Tx carrier leakage measuring (block S1), the controller 40 can measure the Tx carrier leakage using a signal that is obtained by passing the Tx carrier leakage included in the first up-conversion mixer 10 through the second down-conversion mixer 13. Preferably, the controller 40 measures the Tx carrier leakage using a signal that is obtained by passing the Tx carrier leakage included in the first up-conversion mixer 10 through the second down-conversion mixer 13, the IQ filter 32 and the IQ ADC 31.

In the block S1, the first up-conversion mixer 10 and the second down-conversion mixer 13 can be operational, and the second up-conversion mixer 11 and the first down-conversion mixer 12 can be non-operational. Therefore, in this case the first local oscillator 20 is required to transmit the first IQ LO signal I1, Q1 only to the first up-conversion mixer 10 for block S1. For example, the first IQ LO signal I1, Q1 generated in the first local oscillator 20 can be transmitted only to the first up-conversion mixer 10 during the transmission period of the normal operation (block S4) and the Tx carrier leakage measuring (block S1). Therefore, a load condition of the first local oscillator 20 is substantially identical. Therefore, since a Tx carrier leakage value measured in the Tx carrier leakage measuring (block S1) is substantially identical to a Tx carrier leakage value measured during the normal operation (block S4), and thus, the Tx carrier leakage may be accurately compensated.

In contrast to embodiments, if the Tx carrier leakage is measured using the first up-conversion mixer 10 and the first down-conversion mixer 12, the first IQ LO signal I1, Q1 generated in the first local oscillator 20 is transmitted to the first up-conversion mixer 10 and the first down-conversion mixer 12. In such a case, since the load conditions of the first local oscillator 20 when measuring the Tx carrier leakage and during normal operations are different, an identity of the Tx carrier leakage value is not maintained, and the Tx carrier leakage is not accurately compensated. Therefore, embodiments of transceiver circuits and methods for controlling the same in accordance with the invention include the second up-conversion mixer 11, the second down-conversion mixer 13 and the second local oscillator 21, (compared to transceivers that use only one up-conversion mixer, one down-conversion mixer and one local oscillator), to maintain the load condition of the first local oscillator 20 substantially identical during the period of measuring and the normal operation period, which increases an accuracy in compensating the Tx carrier leakage.

In Tx carrier leakage measuring (block S1), it is preferable that a power of the signal outputted by the IQ DAC 30 is zero, and a frequency $\omega_{LO1}$ of the first IQ LO signal I1, Q1 is different from a frequency $\omega_{LO2}$ of the second IQ LO signal I2, Q2. Exemplary signals outputted by the IQ DAC 30, the signal outputted by the first up-conversion mixer 10 and the signal outputted by the second down-conversion mixer 13 are shown in (a),(b) and (c) of FIG. 3, respectively. Since the signal transmitted to the controller 40 has a frequency ($\omega_{LO2}$-$\omega_{LO1}$) as shown in (c) of FIG. 3 and is less affected or not affected by a 1/F noise or a DC offset, the Tx carrier leakage may be accurately measured. In contrast, when the Tx carrier leakage is measured using only the first up-conversion mixer 10, the first down-conversion mixer 12 and the first local oscillator 20 that provides the first IQ LO signal I1, Q1 to the first up-conversion mixer 10, the first down-conversion mixer 12, a frequency of the Tx carrier leakage transmitted to the controller 40 is zero. Therefore, the Tx carrier leakage is hard to distinguish or cannot be distinguished from the 1/F noise and the DC offset, and the Tx carrier leakage may not be accurately measured. Therefore, embodiments of transceiver circuits that include the second up-conversion mixer 11, the second down-conversion mixer 13 and the second local oscillator 21 and embodiments of methods in accordance with the invention have various advantageous over ones using only a first up-conversion mixer (e.g., 10), a first down-conversion mixer (e.g., 12) and a first local oscillator (e.g., 20), for example, the Tx carrier leakage may be more accurately measured.

In the Tx carrier leakage measuring (block S1), the controller 40 allows a signal corresponding to ($\omega_{LO1}$-$\omega_{LO2}$), which corresponds to the Tx carrier leakage using the band pass filter, and removes an effect of the 1/F noise and the DC offset. Thereafter, the controller 40 can obtain the Tx carrier leakage control signal that reduces or minimizes a value of the Tx carrier leakage. The Tx carrier leakage control signal corresponding to a reduced or preferably a minimum Tx carrier leakage value may be obtained by measuring the value of the Tx carrier leakage while varying the Tx carrier leakage control signal.

In Tx IQ mismatch measuring (block S2), the controller 40 can measure the Tx IQ mismatch using a signal that has passed through the first up-conversion mixer 10, the second down-conversion mixer 13. Preferably, the controller 40 measures the Tx IQ mismatch using a signal obtained by passing a signal outputted by the IQ DAC 30 through the first up-conversion mixer 10, the second down-conversion mixer 13, the IQ filter 32 and the IQ ADC 31.

In the Tx IQ mismatch measuring (block S2), only the first up-conversion mixer 10 and the second down-conversion mixer 13 are operational and the second up-conversion mixer 11 and the first down-conversion mixer 12 are non-operational (e.g., similar to one embodiment of the Tx carrier leakage measuring (block S1)). Therefore, since the first local oscillator 20 is required to transmit the first IQ LO signal I1, Q1 only to the first up-conversion mixer 10 in block S2, the load condition of the first local oscillator 20 during block S2 is similar or identical to that of the first local oscillator 20 during the transmission period. Therefore, embodiments of the transceiver circuit and methods according to the invention have various advantageous over methods using only one up-conversion mixer, one down-conversion mixer and one local oscillator because the load condition of the one local oscillator according to embodiments is identical during a Tx IQ mismatch measuring (e.g., block S2) and a normal operation (e.g., block S4) such that the Tx IQ mismatch may be more accurately measured.

Preferably, during the Tx IQ mismatch measuring (block S2), the signal outputted by the IQ DAC 30 is a signal obtained by compensating the Tx carrier leakage. Therefore, an effect by the Tx carrier leakage during measurement of the Tx IQ mismatch may be removed. A filter may also be used to remove the effect.

Preferably, in the Tx IQ mismatch measuring (block S2), the signal outputted by the IQ DAC 30 has a predetermined frequency, and powers of an I channel signal and a Q channel signal included in the signal outputted by the IQ DAC 30 have a predetermined value. In addition, the I channel signal and the Q channel signal included in the signal outputted by the IQ DAC 30 has a phase difference of 90° so that the signal outputted by the first up-conversion mixer 10 may be a single sideband signal when there isn't any IQ mismatch. For example, the I channel signal and the Q channel signal included in the signal outputted by the IQ DAC 30 can be cos $\omega_B t$ and −sin $\omega_B t$, respectively.

Preferably, the frequency $\omega_{BLO1}$ of the first IQ LO signal I1, Q1 is different from the frequency $\omega_{BLO2}$ of the second IQ LO signal I2, Q2, and is larger or smaller than the frequency $\omega_{BLO2}$ of the second IQ LO signal I2, Q2. Accordingly, embodiments of the transceiver circuit and the method for controlling the same in accordance with the invention can include the second up-conversion mixer 11, the second down-conversion mixer 13 and the second local oscillator 21 to use a different frequency for the up-conversion and the down-conversion in the measurement of the Tx IQ mismatch, which can distinguish an effect by the Tx IQ mismatch from an effect by the Rx IQ mismatch. Therefore, embodiments of the transceiver circuit and a method for controlling the same in accordance with the present invention have various advantages over a method where an identical frequency is used for the up-conversion and the down-conversion because the Tx IQ mismatch can be compensated more accurately.

Exemplary signals outputted by the IQ DAC 30, the signal outputted by the first up-conversion mixer 10 and the signal outputted by the second down-conversion mixer 13 are shown in (a), (b) and (c) of FIG. 4, respectively. A test signal T1 is shown in (a) of FIG. 4. An I channel and a Q channel signal of the test signal T1 can be $\cos \omega_B t$ and $-\sin \omega_B t$, respectively. A test signal T1 after passing through the first up-conversion mixer 10 and an image signal IS1 of the test signal T1 caused by the mismatch of the first up-conversion mixer 10 are shown in (b) of FIG. 4. Since the I channel and the Q channel signal of the test signal preferably have the phase difference of 90°, the signal after passing through the first up-conversion mixer 10 should only include the test signal T1 in principle. However, the signal after passing through the first up-conversion mixer 10 additionally includes undesirable IS1, which is a noise component since a real or actual first up-conversion mixer 10 has an IQ mismatch. The test signal T1 after passing through the second down-conversion mixer 13, the image signal IS1 by the first up-conversion mixer 10, an image signal IS2 of the test signal T1 due to the IQ mismatch of the second down-conversion mixer 13 and an image signal IS3 of the IS1 due to the IQ mismatch of the second down-conversion mixer 13 are shown in (c) of FIG. 4. Since the down-conversion mixer is capable of distinguishing the image signal, the image component may be completely removed by subjecting the signal outputted by the down-conversion mixer to a predetermined operation when the IQ mismatch does not occur. However, when the IQ mismatch occurs, the image signals such as IS2 and IS3 shown in (c) of FIG. 4 remain even after subjecting the signal outputted by the down-conversion mixer to the predetermined operation. Since value to be measured in the Tx IQ mismatch measuring (block S2) is a value related to the TX IQ mismatch, the image signal IS1 of the test signal T1 by the first up-conversion mixer 10 is of interest. Therefore, when the IQ filter 32, which is the low pass filter, is used, the IS1 and the image signal IS3 of the IS1 due to the second down-conversion mixer 13 may be obtained. The IS1 and the IS3 are detected by the controller 40, and the controller 40 may remove the Tx IQ mismatch to reduce or minimize the IS1. Alternatively, the controller 40 may remove the Tx IQ mismatch to reduce or minimize the IS1 and IS2. For example, the controller 40 can vary the Tx IQ mismatch control signal that is transmitted to the Tx IQ mismatch compensator 45, and measure IS1 to obtain the Tx IQ mismatch control signal that reduces or minimizes the IS1.

As shown in (c) of FIG. 4, the image IS2 of the test signal T1 caused by the second down-conversion mixer 13 has a negative frequency. This can thus be distinguished from the IS1, which is a signal component corresponding to the Tx IQ mismatch of the first up-conversion mixer 10. Therefore, the amplitude of the IQ mismatch of the second down-conversion mixer 13 is not required to be small in order to compensate the Tx IQ mismatch of the first up-conversion mixer 10.

In Rx IQ mismatch measuring (block S3), the controller 40 can measure the Rx IQ mismatch using a signal that has passed through the second up-conversion mixer 11 and the first down-conversion mixer 12. Preferably, the controller 40 measures the Rx IQ mismatch using a signal that is obtained by passing the signal outputted by the IQ DAC 30 through the second up-conversion mixer 11, the first down-conversion mixer 12, the IQ filter 32 and the IQ ADC 31.

In the Rx IQ mismatch measuring (block S3), preferably only the second up-conversion mixer 11 and the first down-conversion mixer 12 are operational, and the first up-conversion mixer 10 and the second down-conversion mixer 13 are non-operation. Therefore, the load condition of the first local oscillator 20 can be identical to that of the first local oscillator 20 during the reception period of the normal operation period. Therefore, embodiments of tranceiving circuits and methods for controlling the same have various advantages over a method where only one up-conversion mixer, one down-conversion mixer and one local oscillator operate and the load conditions of one local oscillator are not identical and do not provide similar or identical load condition of the first local oscillator 20 in the Rx IQ mismatch measuring (block S3) and the normal operation (block S4). However, the Rx IQ mismatch may be accurately compensated in disclosed embodiments.

Preferably, in the Rx IQ mismatch measuring (block S3), the test signal outputted by the IQ DAC 30 has a predetermined frequency, and powers of an I channel signal and a Q channel signal included in the test signal outputted by the IQ DAC 30 have a predetermined value. In addition, the I channel signal and the Q channel signal included in the signal outputted by the IQ DAC 30 preferably have a phase difference of 90° so that the signal outputted by the second up-conversion mixer 11 may be the single sideband signal when there isn't any IQ mismatch. For example, the I channel signal and the Q channel signal included in the signal outputted by the IQ DAC 30 can be $\cos \omega_B t$ and $\sin \omega_B t$, respectively.

Preferably, the frequency $\omega_{BLO1}$ of the first IQ LO signal I1, Q1 is different from the frequency $\omega_{BLO2}$ of the second IQ LO signal I2, Q2, and is larger or smaller than the frequency $\omega_{BLO2}$ of the second IQ LO signal I2, Q2. Accordingly, embodiments of the transceiver circuit and the method for controlling the same in accordance with the invention further include the second up-conversion mixer 11, the second down-conversion mixer 13 and the second local oscillator 21 to use different frequency for the up-conversion and the down-conversion in the measurement of the Rx IQ mismatch, which can allow effects by the Rx IQ mismatch and the Tx IQ mismatch to be distinguished. Therefore, embodiments of the transceiver circuit and the method for controlling the same in accordance with the invention have various advantages over a method wherein an identical frequency is used for the up-conversion and the down-conversion such that the Rx IQ mismatch can be compensated mote accurately.

Exemplary signals outputted by the IQ DAC 30, the signal outputted by the second up-conversion mixer 11 and the signal outputted by the first down-conversion mixer 12 are shown in (a), (b) and (c) of FIG. 5, respectively. A test signal T1 is shown in (a) of FIG. 5. An I channel and a Q channel signal of the test signal T1 can be $\cos \omega_B t$ and $\sin \omega_B t$, respectively. A test signal T1 after passing through the second up-conversion mixer 11 and an image signal IS1 of the test signal T1 due to the mismatch of the second up-conversion mixer 11 are shown in (b) of FIG. 5. Since the I channel and the Q channel signal of the test signal have the phase difference of 90°, the signal after passing through the second up-conversion mixer 11 should include only the test signal T1 in principle. However, the signal after passing through the second up-conversion mixer 11 additionally includes undesirable IS1, which is a noise component since a real second up-conversion mixer 11 has the IQ mismatch. The test signal T1 after passing through the first down-conversion mixer 12, the image signal IS1 by the second up-conversion mixer 11, an image signal IS2 of the test signal T1 due to the IQ mismatch of the first down-conversion mixer 12 and an image signal IS3 of the IS1 due to the IQ mismatch of the first down-conversion mixer 12 are shown in (c) of FIG. 5. Since the down-conversion mixer is capable of distinguishing the image signal, the image component may be reduced or completely removed by subjecting the signal outputted by the down-conversion mixer to a predetermined operation when the IQ mismatch does not occur. However, when the IQ mismatch occurs, the image signals such as IS2 and IS3 shown in (c) of FIG. 5 remain even after subjecting the signal outputted by the down-conversion mixer to the predetermined operation. Since value to be measured in the Rx IQ mismatch measuring (block S3) is a value related to the Rx IQ mismatch, the image signal IS2 of the test signal T1 by the first down-conversion mixer 12 is of interest. Therefore, when the IQ filter 32, which is the low pass filter, is used, the T1 and the IS2 that is the image signal of T1 because of the first down-conversion mixer 12 may be obtained. The T1 and the IS2 are detected by the controller 40, and the controller 40 may remove the Rx IQ mismatch to reduce or minimize the IS2. For example, the controller 40 may measure the Rx IQ mismatch by receiving the T1 and the IS2 via the method disclosed in U.S. Pat. No. 5,949,821 or U.S. Pat. No. 6,044,112.

As shown in (b) and (c) of FIG. 5, the image IS1 of the test signal T1 caused by the second up-conversion mixer 11 has a positive frequency. This can be used to distinguish the IS2, which is a signal component corresponding to the Rx IQ mismatch of the first down-conversion mixer 12. Therefore, the IQ mismatch of the second up-conversion mixer 11 has no effect on a Rx IQ mismatch measuring process. Therefore, the amplitude of the IQ mismatch of the second up-conversion mixer 11 is not required to be small in order to compensate the Rx IQ mismatch of the first down-conversion mixer 12.

The Tx carrier leakage measuring (block S1), the Tx IQ mismatch measuring (block S2) and the Rx IQ mismatch measuring (block S3) may be carried out at a proper time. For example, such operations may be carried out whenever a power is supplied to the transceiver circuit. However, embodiments are not intended to be so limited. For example, such operation may be carried out when at least one of the temperature and the supply voltage is out of a predetermined range even after the receiver is turned on. For such operations, the receiver may include at least one of a temperature sensor (not shown) and a sensor for measuring a voltage level. It is obvious to the skilled in the art that such operations can be carried out during a period when there is no signal to be transmitted and received when such operations are carried out after the transceiver is turned on During the normal operations (block S4), the first up-conversion mixer 10 and the first down-conversion mixer 12 can be used to carry out a TDD type transmission/reception. Preferably, during the transmission period of the normal operation (block S4), the first up-conversion mixer 10 can convert a signal transmitted to the IQ DAC 30 into the transmission RF signal, and the converted signal is transmitted to the antenna via the power amplifier 50 and the duplexer 52 while such remaining IQ mixers 11, 12 and 13 are non-operational. In addition, during the reception period of normal operations (block S4), the first down-conversion mixer 12 can convert the received RF signal transmitted through the duplexer 52 and the low noise amplifier 51 into a BB or IF signal. The converted signal can be transmitted to the IQ ADC 31 via the IQ filter 32 while remaining IQ mixers 10, 11 and 13 are non-operational.

During normal operations (block S4), the multiplexer 41 can output the transmission signal (e.g., between the transmission signal and the test signal), and the signal outputted by the multiplexer 41 can be compensated for the Tx carrier leakage and the IQ mismatch by the Tx compensator 42, and converted to an analog signal by the IQ DAC 30 to be transmitted to the first up-conversion mixer 10. In addition, the received signal inputted to the IQ ADC 31 can be converted to a digital signal, and compensated for the Rx IQ mismatch by the Rx IQ mismatch compensator 43.

In one embodiment, since the first up-conversion IQ mixer is operational and the first down-conversion IQ mixer is non-operational during the period of measuring the carrier leakage and the IQ mismatch of the first up-conversion IQ mixer similar to the transmission period of the normal operation period, a load condition of the first local oscillator operating during the normal operation period can be approximate to or identical to that of the measuring period. Therefore, a measured value of the carrier leakage or the IQ mismatch obtained has a correspondence with the normal operation period after the measuring period. When the output load of a local oscillator changes, the IQ mismatch value can also change.

In one embodiment, mixers operating during the normal operation period, e.g., a first up-conversion IQ mixer and a first down-conversion IQ mixer should be subjected to the measurement of the carrier leakage or the IQ mismatch. However, since the second up-conversion IQ mixer and the second down-conversion IQ mixer are auxiliary circuits for an accurate measurement without a change in the output load of the first local oscillator, the carrier leakage or the IQ mismatch of the second up-conversion IQ mixer and the second down-conversion IQ mixer are less important in a measurement structure.

As described above, embodiments of methods, apparatus and a receiving circuit in accordance with the invention have various advantages. For example, in accordance with embodiments of tranceiving circuits and corresponding methods, the Tx carrier leakage, the Tx IQ mismatch and the Rx IQ mismatch can be compensated individually or in combination.

In addition, in accordance with tranceiving circuits and methods according to embodiments., the Tx carrier leakage, the Tx IQ mismatch and the Rx IQ mismatch are measured by inputting the output signal of the up-conversion mixer to the down-conversion mixer rather than using a signal received via the wireless communication to measure the Tx carrier leakage, the Tx IQ mismatch and the Rx IQ mismatch, which can improve the measuring process and reduce measurement error caused by the noise by the wireless communication.

Moreover, in accordance with tranceiving circuits and methods for according to embodiments, a load condition during the period of measuring the Tx carrier leakage, the Tx IQ mismatch and the Rx IQ mismatch can be maintained similar or substantially identical to the load condition during normal operations so that variations of the Tx carrier leakage, the Tx IQ mismatch and the Rx IQ mismatch caused by variations of the load condition of the local oscillator may be reduced or prevented.

In addition, in accordance with the tranceiving circuit and the method for controlling the same according to embodiments, the up-conversion IQ mixer and the down-conversion IQ mixer can use different IQ LO frequencies during the measurement of the Tx carrier leakage, the Tx IQ mismatch and the Rx IQ mismatch so that the accuracy of the Tx carrier leakage, the Tx IQ mismatch and the Rx IQ mismatch measurement may be improved.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling a transceiver circuit comprising a first up-conversion IQ mixer, a second up-conversion IQ mixer, a first down-conversion IQ mixer, a second down-conversion IQ mixer, a first local oscillator and a second oscillator, the method comprising:
    (a) measuring a Tx carrier leakage using a signal obtained by passing a Tx carrier leakage included in an output of the first up-conversion IQ mixer through the second down-conversion IQ mixer;
    (b) measuring a Tx IQ mismatch using a signal being passed through the first up-conversion IQ mixer and the second down-conversion IQ mixer;
    (c) measuring a Rx IQ mismatch using a signal being passed through the second up-conversion IQ mixer and the first down-conversion IQ mixer; and
    (d) carrying out transmission/reception using the first up-conversion IQ mixer and the first down-conversion IQ mixer during an operation period,
    wherein the first local oscillator generates a first IQ LO signal used in the first up-conversion IQ mixer and the first down-conversion IQ mixer, and the second oscillator generates a second IQ LO signal used in the second up-conversion IQ mixer and the second down-conversion IQ mixer.

2. The method in accordance with claim 1, wherein the first up-conversion IQ mixer and the second down-conversion IQ mixer are operational and the second up-conversion IQ mixer and the first down-conversion IQ mixer are non-operational in the steps (a) and (b),
    wherein the second up-conversion IQ mixer and the first down-conversion IQ mixer are operational and the first up-conversion IQ mixer and the second down-conversion IQ mixer are non-operational in the step (c),
    wherein the first up-conversion IQ mixer is operational and the first down-conversion IQ mixer, the second up-conversion IQ mixer and the second down-conversion IQ mixer are non-operational during a transmission period of the operation period, and
    wherein the first down-conversion IQ mixer is operational and the first up-conversion IQ mixer, the second up-conversion IQ mixer and the second down-conversion IQ mixer are non-operational during a reception period of the operation period.

3. The method in accordance with claim 1, wherein frequencies of the first IQ LO signal and the second IQ LO signal are different.

4. The method in accordance with claim 1, wherein a power of a signal inputted to the first up-conversion IQ mixer in the step (a) substantially has a value of zero,
    wherein a signal inputted to the first up-conversion IQ mixer in the step (b) has a first prescribed frequency, and signals of I and Q channels of the signal inputted to the first up-conversion IQ mixer have a prescribed first power, and
    wherein a signal inputted to the second up-conversion IQ mixer in the step (c) has a second prescribed frequency, and signals of I and Q channels of the signal inputted to the first up-conversion IQ mixer have a prescribed second power.

5. The method in accordance with claim 1, wherein signals of I and Q channels of a signal inputted to the first up-conversion IQ mixer have a phase difference of 90° in the step (b), wherein signals of I and Q channels of a signal inputted to the second up-conversion IQ mixer have a phase difference of 90° in the step (c), wherein the transceiver circuit is a TDD type transceiver circuit, and wherein the steps (a) through (c) are performed when the receiving circuit is turned on, temperature of the receiving circuit is out of a prescribed range or transitions through a prescribed threshold or a voltage supplied to the receiving circuit is out of a prescribed range or transitions through a prescribed threshold.

6. The method in accordance with claim 1, wherein a signal inputted to the first up-conversion IQ mixer in the step (b) comprises a signal having the Tx carrier leakage compensated for, and
    wherein a signal inputted to the first up-conversion IQ mixer during the operation period comprises a signal having the Tx carrier leakage and the Tx IQ mismatch compensated for, and a signal outputted by the first down-conversion IQ mixer has the Rx IQ mismatch compensated for after being converted to a digital signal.

7. A method for controlling a transceiver circuit comprising a first up-conversion IQ mixer, a first down-conversion IQ mixer, a second down-conversion IQ mixer, a first local oscillator and a second oscillator, the method comprising:
    measuring a Tx carrier leakage using a signal obtained by passing a Tx carrier leakage included in an output of the first up-conversion IQ mixer through the second down-conversion IQ mixer; and
    performing transmission/reception using the first up-conversion IQ mixer and the first down-conversion IQ mixer during an operation period,
    wherein the first local oscillator generates a first IQ LO signal used in the first up-conversion IQ mixer and the first down-conversion IQ mixer, and the second oscillator generates a second IQ LO signal used in the second down-conversion IQ mixer.

8. The method in accordance with claim 7, wherein the first up-conversion IQ mixer and the second down-conversion IQ mixer are operational and the first down-conversion IQ mixer is non-operational when measuring said Tx carrier leakage,
    wherein the first up-conversion IQ mixer is operational and the first down-conversion IQ mixer and the second down-conversion IQ mixer are non-operational during a transmission period of the operation period, and
    wherein the first down-conversion IQ mixer is operational and the first up-conversion IQ mixer and the second down-conversion IQ mixer are non-operational during a reception period of the operation period, and wherein frequencies of the first IQ LO signal and the second IQ LO signal are different.

9. A method for controlling a transceiver circuit comprising a first up-conversion IQ mixer, a first down-conversion IQ mixer, a second down-conversion IQ mixer, a first local oscillator and a second oscillator, the method comprising:
measuring a Tx IQ mismatch using a signal being passed through the first up-conversion IQ mixer and the second down-conversion IQ mixer; and
carrying out a TDD type transmission/reception using the first up-conversion IQ mixer and the first down-conversion IQ mixer during a normal operation period,
wherein the first local oscillator generates a first IQ LO signal used in the first up-conversion IQ mixer and the first down-conversion IQ mixer, and the second oscillator generates a second IQ LO signal used in the second down-conversion IQ mixer.

10. The method in accordance with claim 9, wherein the first up-conversion IQ mixer and the second down-conversion IQ mixer are operational and the first down-conversion IQ mixer is non-operational when measuring said Tx IQ mismatch, wherein the first up-conversion IQ mixer is operational and the first down-conversion IQ mixer and the second down-conversion IQ mixer are non-operational during a transmission period of the normal operation period, and
wherein the first down-conversion IQ mixer is operational and the first up-conversion IQ mixer and the second down-conversion IQ mixer are non-operational during a reception period of the normal operation period, and wherein frequencies of the first IQ LO signal and the second IQ LO signal are different.

11. A method for controlling a transceiver circuit comprising a first up-conversion IQ mixer, a second up-conversion IQ mixer, a first down-conversion IQ mixer, a first local oscillator and a second oscillator, the method comprising:
measuring a Rx IQ mismatch using a signal being passed through the second up-conversion IQ mixer and the first down-conversion IQ mixer;
carrying out a transmission/reception using the first up-conversion IQ mixer and the first down-conversion IQ mixer during an operation period,
generating a first IQ LO signal used in the first up-conversion IQ mixer and the first down-conversion IQ mixer using the first local oscillator; and
generating a second IQ LO signal used in the second up-conversion IQ mixer using the second oscillator,
wherein the second up-conversion IQ mixer and the first down-conversion IQ mixer are operational and the first up-conversion IQ mixer is non-operational when measuring said Rx IQ mismatch,
wherein the first up-conversion IQ mixer is operational and the first down-conversion IQ mixer and the second up-conversion IQ mixer are non-operational during a transmission period of the operation period, and
wherein the first down-conversion IQ mixer is operational and the first up-conversion IQ mixer and the second up-conversion IQ mixer are non-operational during a reception period of the normal operation period, and wherein frequencies of the first IQ LO signal and the second IQ LO signal are different.

12. A transceiver circuit, comprising:
a first up-conversion IQ mixer;
a second up-conversion IQ mixer;
a first down-conversion IQ mixer with an input to receive an output of the second up-conversion IQ mixer;
a second down-conversion IQ mixer with an input to receive an output of the first up-conversion IQ mixer;
a first local oscillator to generate a first IQ LO signal coupled to the first up-conversion IQ mixer and the first down-conversion IQ mixer; and
a second local oscillator to generate a second IQ LO signal coupled to the second up-conversion IQ mixer and the second down-conversion IQ mixer.

13. The circuit in accordance with claim 12, further comprising:
an IQ DAC having an output respectively coupled to an input of the first up-conversion IQ mixer and the second up-conversion IQ mixer;
an IQ filter coupled to receive outputs of the first down-conversion IQ mixer and the second down-conversion IQ mixer;
a IQ ADC coupled to receive an output of the IQ filter;
a power amplifier to receive the output of the first up-conversion IQ mixer;
a low noise amplifier with an output coupled to an input of the first down-conversion IQ mixer; and
a duplexer to transceive an RF signal with an antenna, wherein the duplexer is coupled to receive a transmission RF signal from the power amplifier and output a received RF signal to the low noise amplifier.

14. The circuit in accordance with claim 13, further comprising:
a multiplexer to select and output one of a transmission signal corresponding to the transmission RF signal and a test signal;
a Tx compensator configured to receive an output of the multiplexer to compensate a Tx carrier leakage and a Tx IQ mismatch of a signal received according to a Tx carrier leakage control signal and a Tx IQ mismatch control signal and output the compensated signal to the IQ DAC;
a Rx IQ mismatch compensator configured to receive an output of the IQ ADC to compensate a Rx IQ mismatch of a signal received according to a Rx IQ mismatch control signal; and
a controller configured to generate the test signal, to receive the output of the IQ ADC to measure the Tx carrier leakage, the Tx IQ mismatch and the Rx IQ mismatch, and to generate the Tx carrier leakage control signal, the Tx IQ mismatch control signal and the Rx IQ mismatch control signal.

15. The circuit in accordance with claim 12, wherein frequencies of the first IQ LO signal and the second IQ LO signal are different.

16. The circuit in accordance with claim 12, wherein the first up-conversion IQ mixer and the second down-conversion IQ mixer are operational, and the second up-conversion IQ mixer and the first down-conversion IQ mixer are non-operational during a period of measuring the Tx carrier leakage.

17. The circuit in accordance with claim 16, wherein a power of a signal inputted to the first up-conversion IQ mixer during the period of measuring the Tx carrier leakage is zero.

18. The circuit in accordance with claim 12, wherein the first up-conversion IQ mixer and the second down-conversion IQ mixer are operational, and the second up-conversion IQ mixer and the first down-conversion IQ mixer are non-operational when measuring the Tx IQ mismatch.

19. The circuit in accordance with claim 18, wherein the Tx carrier leakage is compensated for a signal inputted to the first up-conversion IQ mixer when the Tx IQ mismatch is measured.

20. The circuit in accordance with claim 12, wherein the second up-conversion IQ mixer and the first down-conversion IQ mixer are operational, and the first up-conversion IQ mixer and the second down-conversion IQ mixer are non-operational during a period of measuring the Rx IQ mismatch.

21. The circuit in accordance with claim 12, wherein the second up-conversion IQ mixer and the second down-conversion IQ mixer are non-operational, and the first up-conversion IQ mixer and the first down-conversion IQ mixer are respectively used to perform a TDD type transmission/reception operation.

* * * * *